UNITED STATES PATENT OFFICE.

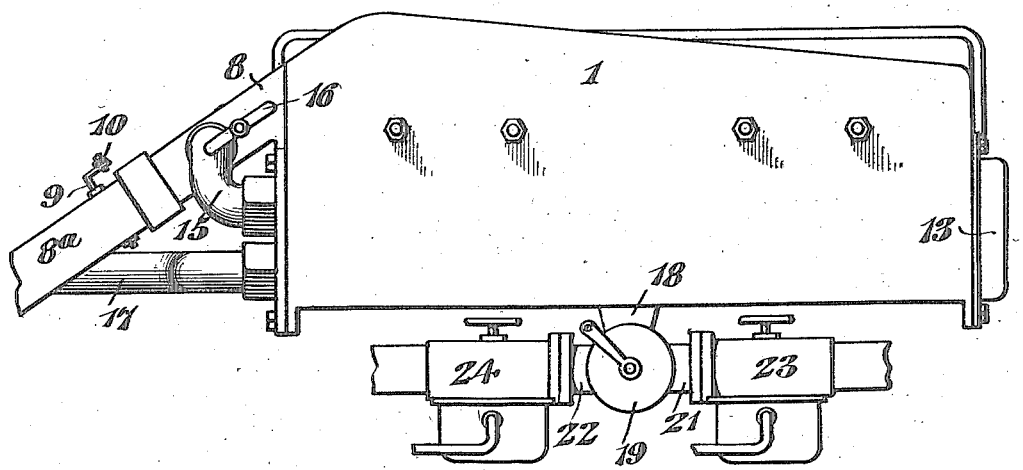
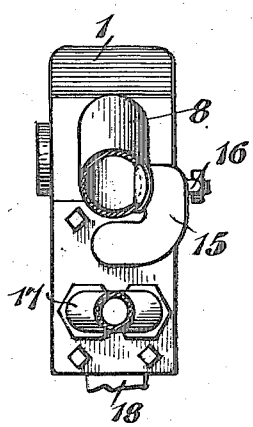
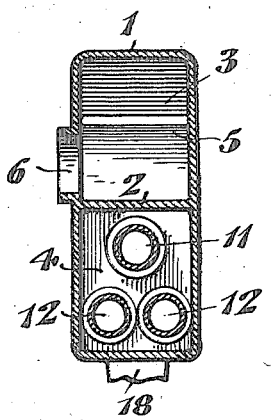
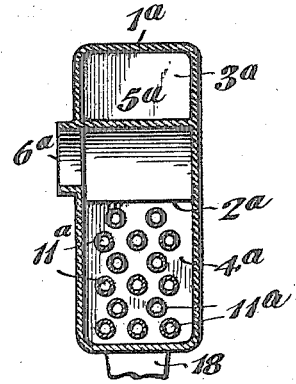

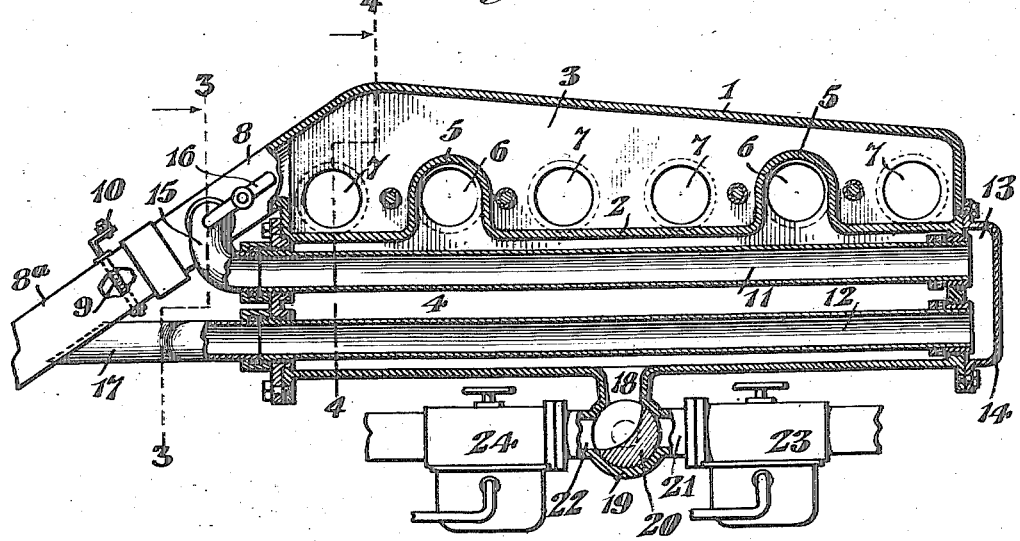
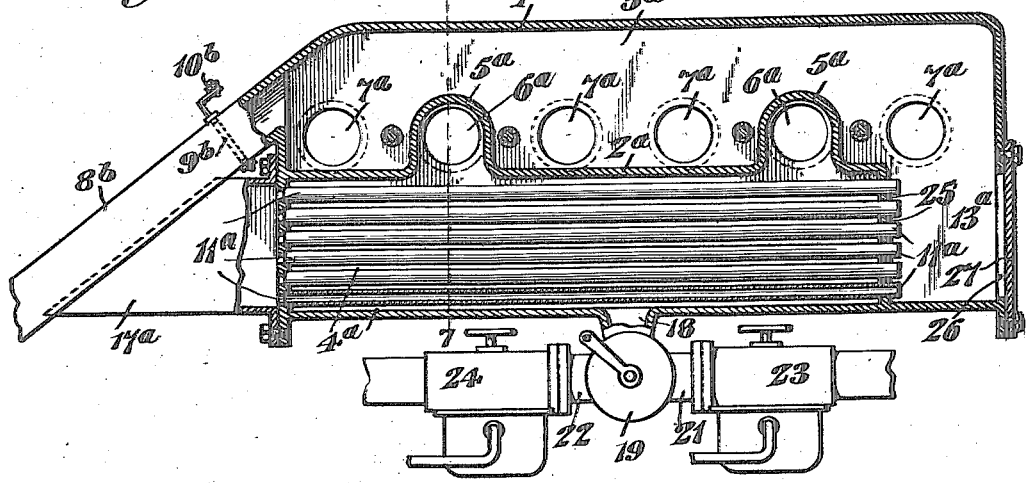

JOHN J. FAHRNEY, OF TIMBERVILLE, VIRGINIA, ASSIGNOR OF ONE-FOURTH TO HARRY O. NICODEMUS, OF WOODSTOCK, VIRGINIA, AND ONE-FOURTH TO AUGUSTUS W. NICODEMUS AND ONE-FOURTH TO FRANKLIN C. THOMAS, BOTH OF BUCKEYSTOWN, MARYLAND.

EXPLOSION-ENGINE VAPORIZER FOR HEAVY FUELS.

1,220,968.   Specification of Letters Patent.   Patented Mar. 27, 1917.

Application filed April 8, 1916. Serial No. 89,855.

*To all whom it may concern:*

Be it known that I, JOHN J. FAHRNEY, a citizen of the United States, residing at Timberville, in the county of Rockingham and State of Virginia, have invented a new and useful Explosion-Engine Vaporizer for Heavy Fuels, of which the following is a specification.

This invention has reference to explosion engine vaporizers for heavy fuels, and its object is to provide means whereby a hydrocarbon, such as kerosene, may be used as a fuel for an explosion engine with an efficiency corresponding to or greater than that of gasolene.

In accordance with the present invention provision is made for starting the engine upon some highly volatile fuel, such as gasolene, and then utilizing the heat of the exhaust for effecting the thorough gasification of kerosene delivered from a carbureter in an imperfectly vaporized condition.

It has heretofore been proposed to heat heavy fuels by means of the exhaust, but such heating has not been of a character to give the efficiency to such heavy fuels as is obtained from light fuels like gasolene. With the present invention the heavy fuel in a spray-like condition and not thoroughly gasified is subjected to the heat of the exhaust progressively, the intensity of the heat acting upon the fuel increasing to the point of delivery of the fuel in that portion of the manifold directly entering the engine cylinders.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

In the drawings:—

Figure 1 is an elevation of a structure combining the intake and exhaust manifolds and incorporating the present invention.

Fig. 2 is a longitudinal vertical section through the structure of Fig. 1, some parts being shown in elevation.

Fig. 3 is a section on the line 3—3 of Fig. 2.

Fig. 4 is a section on the line 4—4 of Fig. 2 with some distant parts omitted.

Fig. 5 is a detail plan view of a connection used in the structure of Fig. 1.

Fig. 6 is a section similar to Fig. 2 but showing a somewhat different arrangement.

Fig. 7 is a section on the line 7—7 of Fig. 6.

Fig. 8 is a detail plan view of a connection used in the structure of Fig. 6.

Referring to the drawings there is shown a casing 1 having an intermediate longitudinal wall 2 dividing the casing into two chambers 3, 4, respectively. The wall 2 has upstanding loops 5 at appropriate points, the interior of these loops communicating with the chamber 4. Opening through one side wall of the casing 1 at and within the loops 5 are passages 6 leading to the manifold branched to the intakes of the various engine cylinders, such manifold and engine cylinders not being shown as they do not differ from the ordinary parts in explosion engines, especially engines of the multi-cylinder type used in automobiles.

One side wall of the casing 1 is provided with a suitable number of passages 7 all opening into the chamber 3 and designed to communicate with the exhaust ports of the various engine cylinders.

Leading from the chamber 3 is an exhaust pipe 8, such as is customarily employed in automobile explosion engines for conducting the exhaust to a suitable point of discharge. In the pipe 8 or a continuation 8ª thereof is a valve or damper 9 to which may be connected a controlling reach rod 10 leading to any suitable point, such as within reach of the operator of the automobile, so that the valve may be opened or closed at will.

Extending lengthwise through the chamber 4 are pipes 11, 12, respectively, the pipes 12 being customarily two in number to one pipe 1, although such particular arrangement is not obligatory. The pipes 11 and 12 extend at their ends through the corresponding end walls of the chamber 4 and at the end remote from the exhaust pipe 8 the pipes 11 and 12 enter another chamber 13 formed at the ends of the pipes, by a cap 14 made fast to the outer face of the corresponding end of the casing 1. At the other end the pipe 11 is connected to a coupling 15 entering the exhaust pipe 8 on the casing side of the valve 9, and this coupling 15 may be held to the pipe 8 by the usual holding clip 16 quite commonly employed on certain types of automobiles. Of course, the pipe 11 may be connected to the pipe 8 by other means than those shown.

The pipes 12 at the ends remote from the chamber 13 are connected by a common coupling 17 to the continuation 8ª of the pipe 8, the coupling 17 opening into the continuation 8ª on the discharge side of the valve 9.

The casing 1 is provided with a neck 18 or other suitable coupling means connecting a valve casing 19 to the chamber 4. Within the casing 19 is a valve 20 and extending from the casing 19 in different directions are coupling necks 21, 22, respectively. Connected to the neck 21 is a carbureter 23 and connected to the neck 22 is a carbureter 24. Both of these carbureters are shown more or less conventionally and without any attempt to indicate any special construction, since any suitable carbureter, of which many types are found on the market, may be employed in connection with the invention. The valve 20 may be controlled from any convenient point within reach of the operator of the vehicle, but as such devices are of common occurrence in automobiles, no attempt is made to show one in the drawings.

The structure described may be varied somewhat, as shown in Fig. 6 and associated figures. There is a casing 1ª having a wall 2ª with loops 5ª and with passages 6ª and 7ª through the sides of the casing similar to passages described with reference to Fig. 2 by reference letters omitting the exponent. The casing 1ª has an exhaust pipe 8ᵇ with a valve 9ᵇ and controlling means 10ᵇ similar to the arrangement described with reference to Fig. 1. The casing 1ª incloses chambers 3ª and 4ª, while the chamber 4ª is shorter than the chamber 3ª, the wall 2ª terminating in another wall 25 leaving a space 13ª between the wall 25 and the corresponding end of the casing having a function similar to the chamber 13 of the structure of Fig. 2. A group of pipes 11ª extend lengthwise through the chamber 4ª and open through the wall 25 and the other end of the casing 1ª. The pipes 11ª all communicate with the chamber 13ª and the other ends of the pipes open into a coupling 17ª connecting to the pipe 8ᵇ on the side of the valve 9ᵇ toward the outlet of the pipe 8ᵇ. The casing 1ª opposite the wall 25 has an opening 26 covered by a cap plate 27, so that access may be had as desired to the pipes 11ª. The structure of Fig. 6 is provided with a neck 18, a valve casing 19, a valve 20, necks 21 and 22 and carbureters 23 and 24 like similar parts of the structure of Fig. 2.

When it is desired to start the engine, the valve 20 is turned so as to connect the carbureter 23 with the chamber 4 and the valve 9 is opened. The carbureter 23 is assumed to be connected with a supply of gasolene or other correspondingly volatile fuel. The engine, therefore, starts on a highly volatile fuel after the usual manner. For a few explosions the exhaust passing through the chamber 3 leaves the latter and escapes freely through the pipes 8 and 8ª of Fig. 2, or 8ᵇ of Fig. 6. Now, the operator closes the valve 9, whereby the exhaust is caused to flow from the chamber 3 through the pipe 11, thence by way of the chamber 13 into the pipes 12 and out through the continuation 8ª, the course of the gases of explosion being in series through the pipe 11 and pipes 12, although in multiple through the latter. In the structure of Fig. 6 the exhaust, when the valve 9ᵇ is closed, is into the chamber 13ª and through all the pipes 11ª in multiple into the coupling 17ª and so to the discharge end of the exhaust. When the pipes 11 and 12 or the pipes 11ª have become heated, the valve 20 is turned, so as to cut out the carbureter 23 and cut in the carbureter 24 which is assumed to be connected with some heavy fuel like kerosene. Such carbureter will vaporize kerosene without, however, thoroughly gasifying it, so that the vapor is heavy and wet as it leaves the carbureter and is ill adapted for use in such condition in an explosion engine. The heavy wet vapor enters the chamber 4 and coming in contact with the hot pipes 12 of the structure of Fig. 2 becomes partially gasified, and then passing to the pipe 11, which being nearer the engine cylinders is hotter than the pipes 12, becomes still further gasified and then striking the still hotter wall 2 and entering the hot loops 5 the kerosene vapor is then completely gasified, just prior to the time it passes to the engine cylinders, and hence has no time to become cooled and condensed, but enters the engine cylinders in the thoroughly gaseous condition and with the proper admixture of air constitutes an explosive mixture corresponding to other gaseous explosive mixtures whether the fuel be gasolene or some other highly volatile or previously gasified material. In the structure of Fig. 2, which is the preferred form, the vaporized, more or less misty and highly subdivided fuel is progressively subjected to higher and higher temperatures, so that when it enters the engines it is completely gasified. In the structure of Fig. 6 such progressive gasification is not so pronounced because the gradation of heat in the pipes 11ª is not so well regulated as in the structure of Fig. 2. The hot surfaces represented by the wall 2ª and the loops 5ª are, however, present in the structure of Fig. 6 and their effect is well pronounced, so that while not quite so efficient as the structure of Fig. 2, the structure of Fig. 6 will be found very satisfactory.

One feature of the invention is that the heavy fuel in a highly sub-divided, though still wet and only partially gasified condition, is subjected to the heat of the exhaust in such manner that when thoroughly gasified by such heat it has but a minimum distance to travel to reach the interior of the cylinders, the highest temperature to which it is subjected being immediately adjacent to the point of direction of the gasified fuel into the engine cylinders, wherefore the passages through which the fuel after being thoroughly gasified reaches the engine cylinders are very short.

What is claimed is:—

1. A means for the utilization of heavy fuels in explosion engines, comprising a casing having a chamber immediately adjacent to the engines and into which the exhaust from the engine is directed, another chamber within the casing through which the incoming fuel is directed to the engine, and ducts for the engine exhaust traversing the second-named chamber with the two chambers divided one from the other by a wall partially encircling the connections between the second-named chamber and the intakes of the engine cylinders.

2. A means for the utilization of heavy fuels in explosion engines, comprising a casing having a transverse, internal division wall defining separate chambers within the casing, one chamber having inlets for connecting it with the exhaust side of the engine, and the other chamber having outlets for communication with the intakes of the engine with each outlet partially surrounded by the division wall, and ducts through the second chamber communicating with the first-named chamber and having means for the discharge of the exhaust after passing through the ducts.

3. A means for the utilization of heavy fuels in explosion engines, comprising a casing having a transverse, internal division wall defining separate chambers within the casing, one chamber having inlets for connecting it with the exhaust side of the engine, and the other chamber having outlets for communication with the intakes of the engine with each outlet partially surrounded by the division wall, and ducts through the second chamber communicating with the first-named chamber and having means for the discharge of the exhaust after passing through the ducts, the first-named chamber being provided with an outlet having a controlling valve therein for causing the direct escape of the products of combustion from said first-named chamber or the diverting of such products of combustion through the ducts in the second-named chamber, at will.

4. A means for the utilization of heavy fuels in explosion engines, comprising a casing with a transverse internal division wall separating the interior of the casing into two chambers and the division wall having loop portions, the casing being provided with passages for connecting the exhaust side of the engine with the first-named chamber and other passages within the loops of the division wall for connecting the second-named chamber with the intake side of the engine, and ducts leading through the second-named chamber and connected up in series with the first-named chamber.

5. A means for the utilization of heavy fuels in explosion engines, comprising a casing with a transverse internal division wall separating the interior of the casing into two chambers and the division wall having loop portions, the casing being provided with passages for connecting the exhaust side of the engine with the first-named chamber and other passages within the loops of the division wall for connecting the second-named chamber with the intake side of the engine, and ducts leading through the second-named chamber and connected up in series with the first-named chamber, and the first-named chamber having an outlet with a valve therein for directing the exhaust from the first-named chamber to a point of escape or through the ducts in the second-named chamber, at will.

6. A means for the utilization of heavy fuels in explosion engines, comprising a casing with a transverse internal wall extending from side to side of the casing, and separating the interior of said casing into two chambers free from communication one with the other, the casing having means for directing the exhaust of the engine into the first-named chamber and means for directing volatile fuels into the second-named chamber, and said second-named chamber having means adjacent to the division wall for directing fuel to the engine, and ducts for the exhaust communicating with the first-named chamber and leading through the second-named chamber.

In testimony, that I claim the foregoing as my own, I have hereto affixed my signature in the presence of two witnesses.

JOHN J. FAHRNEY.

Witnesses:
O. W. MILLER,
LUCY M. COFFMAN.